United States Patent [19]

Cetinkaya et al.

[11] Patent Number: 4,578,366

[45] Date of Patent: Mar. 25, 1986

[54] FCC COMBUSTION ZONE CATALYST COOLING PROCESS

[75] Inventors: Ismail B. Cetinkaya, Mt. Prospect; Daniel N. Myers, Arlington Heights, both of Ill.

[73] Assignee: UOP Inc., Des Plaines, Ill.

[21] Appl. No.: 687,352

[22] Filed: Dec. 28, 1984

[51] Int. Cl.⁴ .................. B01J 21/20; C10G 11/18
[52] U.S. Cl. .................. 502/6; 208/DIG. 1; 208/113; 208/164; 422/144; 502/41
[58] Field of Search .................. 502/6, 41–44; 208/164, 113, DIG. 1

[56] References Cited

U.S. PATENT DOCUMENTS

| | | | |
|---|---|---|---|
| 2,377,657 | 6/1945 | Watts | 502/44 |
| 2,492,948 | 1/1950 | Berger | 252/417 |
| 2,506,123 | 5/1950 | Watson | 23/288 |
| 2,515,156 | 7/1950 | Jahnig et al. | 23/288 |
| 2,596,748 | 5/1952 | Watson et al. | 252/417 |
| 2,819,951 | 1/1958 | Medlin et al. | 23/288 |
| 2,862,798 | 12/1958 | McKinney | 23/288 |
| 2,873,175 | 2/1959 | Owens | 23/288 |
| 2,970,117 | 1/1961 | Harper | 252/417 |
| 3,990,992 | 11/1976 | McKinney | 252/417 |
| 4,219,442 | 8/1980 | Vickers | 252/417 |
| 4,364,849 | 12/1982 | Vickers et al. | 252/417 |
| 4,374,750 | 2/1983 | Vickers et al. | 502/41 |
| 4,396,531 | 8/1983 | Lomas | 252/417 |
| 4,425,301 | 1/1984 | Vickers et al. | 422/111 |
| 4,434,044 | 2/1984 | Busch et al. | 208/91 |
| 4,434,245 | 2/1984 | Lomas et al. | 502/2 |

OTHER PUBLICATIONS

Chin-Yung Wen et al, "Fluidized-bed Heat Transfer: A Generalized Dense-phase Correlation," A.I.Ch.E. Journal, Dec. 1956, pp. 482–488.

Primary Examiner—P. E. Konopka
Attorney, Agent, or Firm—Thomas K. McBride; William H. Page, II; John F. Spears, Jr.

[57] ABSTRACT

A process and apparatus for the cooling of hot fluidized solid particles such as catalyst of an FCC petroleum refining process. The particles flow downward from a first dense phase fluidized bed into a cooling chamber and contact the shell side of a vertically oriented shell and tube heat exchanger where cooling occurs via indirect heat exchange with a cooling medium circulating in the tubes. The extent of cooling is controlled by the varying of the heat transfer coefficient between the tubes and particles in the heat exchanger. The coefficient is varied by changing the quantity of fluidizing gas fed to the fluidized bed in the heat exchanger. The heat exchanger is located within a lower portion of the cooling chamber totally below the particle inlet and outlet conduits. The heat exchanger can therefore be removed from service and protected by being buried under unfluidized relatively cool catalyst. The fluidizing gas supports combustion within a lower combustion zone.

8 Claims, 2 Drawing Figures

FCC COMBUSTION ZONE CATALYST COOLING PROCESS

BACKGROUND OF THE INVENTION

The field of art to which this invention pertains is fluid particle cooling. It particularly relates to the combustion of combustible material or stripping of strippable material from a particulated solid such as fluidizable catalyst which has been contaminated by the deposition thereupon of the combustible or strippable material, coke. The present invention will be most useful in a process for regenerating coke-contaminated fluid cracking catalyst, but it should find use in any process in which combustible material is burned or strippable material is stripped from solid, fluidizable particles.

BACKGROUND INFORMATION

The fluid catalyst cracking process (hereinafter FCC) has been extensively relied upon for the conversion of feed materials, such as vacuum gas oils, and other relatively heavy oils, into lighter and more valuable products. FCC involves the contact in a reaction zone of the hydrocarbonaceous charge stock with a finely divided, or particulated, solid, catalytic material which behaves as a fluid when mixed with a gas or vapor. This material possesses the ability to catalyze the cracking reaction, and in so acting its surface becomes covered with coke, a by-product of the cracking reaction. Coke is comprised of hydrogen, carbon and other material such as sulfur, and it interferes with the catalytic activity of FCC catalysts. Facilities for the removal of coke from FCC catalyst, so-called regeneration facilities or regenerators, are ordinarily provided within an FCC unit. Regenerators contact the coke-contaminated catalyst with an oxygen-containing gas at conditions such that the coke is oxidized and a considerable amount of heat is released. A portion of this heat escapes the regenerator with flue gas, comprised of excess regeneration gas and the gaseous products of coke oxidation, and the balance of the heat leaves the regenerator with the regenerated, or relatively coke-free, catalyst. Regenerators operating at superatmospheric pressures are often fitted with energy-recovery turbines which expand the flue gas as it escapes from the regenerator and recover a portion of the energy liberated in the expansion.

The fluidized catalyst is continuously circulated from the reaction zone to the regeneration zone and then again to the reaction zone. The fluid catalyst, as well as providing catalytic action, acts as a vehicle for the transfer of heat from zone to zone. Catalyst exiting the reaction zone is spoken of as being "spent," that is, partially deactivated by the deposition of coke upon the catalyst. Catalyst from which coke has been substantially removed is spoken of as "regenerated catalyst."

The rate of conversion of the feedstock within the reaction zone is controlled by regulation of the temperature, activity of catalyst and quantity of catalyst (i.e., catalyst to oil ratio) therein. The most common method of regulating the temperature is by regulating the rate of circulation of catalyst from the regeneration zone to the reaction zone which simultaneously increases the catalyst/oil ratio. That is to say, if it is desired to increase the conversion rate, an increase in the rate of flow of circulating fluid catalyst from the regenerator to the reactor is effected. Inasmuch as the temperature within the regeneration zone under normal operations is considerably higher than the temperature within the reaction zone, this increase in influx of catalyst from the hotter regeneration zone to the cooler reaction zone effects an increase in reaction zone temperature.

The chemical nature and molecular structure of the feed to the FCC unit will affect the level of coke on spent catalyst. Generally speaking, the higher the molecular weight, the higher the Conradson carbon, the higher the heptane insolubles, and the higher the carbon to hydrogen ratio, the higher will be the coke level on the spent catalyst. Also, high levels of combined nitrogen, such as found in shale derived oils, will also increase the coke level on spent catalyst. The processing of heavier and heavier feedstocks, and particularly the processing of deasphalted oils, or direct processing of atmospheric bottoms from a crude unit, commonly referred to as reduced crude, does cause an increase in all or some of these factors and does therefore cause an increase in coke level on spent catalyst.

This increase in coke on spent catalyst results in a larger amount of coke burnt in the regenerator per pound of catalyst circulated. Heat is removed from the regenerator in conventional FCC units in the flue gas and principally in the hot regenerated catalyst stream. An increase in the level of coke on spent catalyst will increase the temperature difference between the reactor and the regenerator, and increase the regenerated catalyst temperature. A reduction in the amount of catalyst circulated is therefore necessary in order to maintain the same reactor temperature. However, this lower catalyst circulation rate required by the higher temperature difference between the reactor and the regenerator will result in a fall in conversion, making it necessary to operate with a higher reactor temperature in order to maintain conversion at the desired level. This will cause a change in yield structure which may or may not be desirable, depending on what products are required from the process. Also there are limitations to the temperatures that can be tolerated by FCC catalyst without there being a substantial detrimental effect on catalyst activity. Generally, with commonly available modern FCC catalyst, temperatures of regenerated catalyst are usually maintained below 1400° F., since loss of activity would be severe at about 1400° F.

If a relatively common reduced crude such as that derived from Light Arabian crude oil were charged to a conventional FCC unit, and operated at a temperature required for high conversion to lighter products, i.e., similar to that for a gas oil charge, the regenerator temperature would operate in the range of 1500°–1800° F. This would be too high a temperature for the catalyst, require very expensive materials of construction, and give an extremely low catalyst circulation rate. It is therefore accepted that when materials are processed that would give excessive regenerator temperatures, a means must be provided for removing heat from the regenerator, which enables a lower regenerator temperature, and a lower temperature difference between the reactor and regenerator.

A common prior art method of heat removal provides coolant filled coils within the regenerator, which coils are in contact with the catalyst from which coke is being removed. For example, Medlin et al. U.S. Pat. No. 2,819,951, McKinney U.S. Pat. No. 3,990,992 and Vickers U.S. Pat. No. 4,219,442 disclose fluid catalytic cracking processes using dual zone regenerators with cooling coils mounted in the second zone. These cooling coils must always be filled with coolant and thus be removing heat from the regenerator, even during start-up when such removal is particularly undesired, because the typical metallurgy of the coils is such that the coils would be damaged by exposure to the high regenerator temperature (up to 1350° F.) without coolant serving to keep them relatively cool. The second regeneration zone is also for catalyst disengagement prior to passing the flue gas from the system, and may contain catalyst in a dense phase (Medlin et al. and Vickers) or in a dilute phase (McKinney). Coolant flowing through the coils absorbs heat and removes it from the regenerator.

The prior art is also replete with disclosures of FCC processes which utilize dense or dilute phase regenerated fluid catalyst heat removal zones or heat exchangers that are remote from and external to the regenerator vessel to cool hot regenerated catalyst for return to the regenerator. Examples of such disclosures are as set forth in Harper U.S. Pat. No. 2,970,117; Owens U.S. Pat. No. 2,873,175; McKinney U.S. Pat. No. 2,862,798; Watson et al. U.S. Pat. No. 2,596,748; Jahnig et al. U.S. Pat. No. 2,515,156; Berger U.S. Pat. No. 2,492,948; Watson U.S. Pat. No. 2,506,123 and Hettinger et al. U.S. Pat. No. 4,434,044. At least one of the above U.S. Patents (Harper) discloses that the rate of return of the cooled catalyst to the regenerator may be controlled by the regenerator (dense catalyst phase) temperature. It is also pertinent to note that in the Jahnig et al. reference the catalyst is fluidized through the cooler by air. The air subsequently enters the regeneration zone. In the Berger reference the catalyst is also fluidized by air charged to the catalyst regeneration zone.

An important consideration in the above FCC processes involving regenerator heat removal is the method of controlling quantity of heat removed. For example, in previously cited Vickers U.S. Pat. No. 4,219,442 the method involves the control of the extent of immersion of cooling coils in a dense phase regenerated catalyst fluidized bed. In previously cited Harper U.S. Pat. No. 2,970,117 and Hettingher et al U.S. Pat. No. 4,434,044, the method involves regulation of the rate of flow of regenerated catalyst through external catalyst coolers. The disadvantages of the first above heat removal method have been previously discussed, i.e., interference of the cooling coils with unit start-up and catalyst disengagement. The above second method of heat removal, utilizing external coolers and varying the rate of catalyst circulation through them as the exclusive means of control of the heat exchanger duty, involves the continual substantial changing of the catalyst loading on the regenerator with the associated difficulty or impossibility of maintaining convenient steady state operations.

It is known to those skilled in the art of chemical engineering that the heat transfer coefficient of a heat exchange surface varies in relation to the mass velocity across such surface for fluidized systems. See, for example, the article "Fluidized-bed Heat Transfer: A Generalized Dense-phase Correlation"; *A.I.Ch.E. Journal;* December, 1956: Vol. 2, No. 4; ppg. 482–488. This principle was put to good use in the processes taught in U.S. Pat. No. 4,364,849 to Vickers et al, which illustrates a "back mixed" catalyst cooling zone. The use of fluidizing gas to control heat transfer in "flow through" catalyst cooling zone is shown in U.S. Pat. Nos. 4,396,531 to Lomas, 4,425,301 to Vickers et al and 4,434,245 to Lomas et al. In these patent references the duty of an external particle cooler comprising a shell and tube heat exchanger is controlled by controlling the rate of a fluidizing gas to the cooler and the quantity of hot particles passing through the cooler.

The present invention enables an even higher degree of flexibility and efficiency of operation of a fluidized particle cooler, particularly when associated with an FCC regenerator with a remote cooler, but unlike the above prior art FCC processes, the present invention not only controls the rate of cooling by the heat exchanger in a manner based upon principles involving the relationship between heat transfer coefficients and mass velocity, but also enables further utilization of the fluidizing gas. Specifically air employed as the fluidizing gas is directed into the lower combustion zone for consumption in coke combustion.

SUMMARY OF THE INVENTION

A basic objective of the present invention is to provide an apparatus which not only enables control of the duty of a particle cooler by control of the rates of fluidizing gas and particle flow, but also achieves subsequent advantageous utilization of the fluidizing gas. A further objective of the subject invention is to provide an apparatus for cooling FCC catalyst which may be temporarily removed from service when it is not required, as during start up procedures, without damaging the heat exchange tubing.

In the subject invention the heat exchange coils are located in a lower portion of a catalyst cooling chamber below the catalyst outlet from the cooling zone. Therefore, the heat exchange coils may be covered with stagnant catalyst by shutting off the fluidizing gas flow.

Accordingly, the invention is, in one embodiment, a process for the combustion of a combustible material present on fluidized solid particles which comprises the steps of: introducing a first stream of oxygen-containing combustion gas and said fluidized solid particles into a combustion zone maintained at a temperature sufficient for oxidation of said combustible material and therein oxidizing said combustible material to produce hot fluidized solid particles; passing solid particles upward by fluidization from the combustion zone into a second zone located above the combustion zone, and collecting a dense phase bed of hot solid particles in a particle collection section located at the bottom of said second zone; transferring a stream of solid particles downward from said particle collection section through a particle flow control means and a vertically orientated first particle transfer conduit into an upper end of a backmixed particle cooling chamber; cooling particles present in a backmixed dense phase fluidized particle bed located in a lower portion of the particle cooling chamber through the use of a heat exchanger entirely present in the lower portion of the particle cooling chamber; fluidizing said dense phase fluidized particle bed in a controlled manner by the upward passage of a controlled flow of a second stream of oxygen-containing combustion gas; and, discharging the second stream of combustion gas from the cooling chamber into the combustion zone through a second particle transfer conduit communicating with the cooling chamber at a point above the heat exchanger.

In still another embodiment, the present invention is an apparatus for the combustion of a combustible material present on fluidized solid particles which apparatus comprises: a vertically oriented combustion chamber; a disengagement chamber located superadjacent to and above said combustion chamber and in communication therewith, there being a hot fluid particle collection section located at the bottom of the disengagement chamber; a vertically oriented cooling chamber surrounding at least one heat exchanger of vertical orientation, the cooling chamber being in close proximity to a lower portion of the combustion chamber, the cooling chamber having an upper particle inlet and a lower particle outlet, with the entire heat exchanger being located below the particle outlet; a hot particle conduit of vertical orientation connecting the hot particle collection section of the disengagement chamber with the cooling chamber particle inlet, such that hot particles can flow downwardly from the disengagement chamber to the cooling chamber; a particle flow restriction means in the hot particle conduit; an open passageway connecting the particle outlet of the cooling chamber with the combustion chamber and providing means for the flow of cooled particles and fluidizing combustion gas from the heat exchanger to the combustion chamber; a fluidizing combustion gas inlet conduit connected to a bottom portion of the cooling chamber providing means for the passage of fluidizing gas onto the shell side of the heat exchanger and maintaining a fluidized catalyst bed within the cooling chamber; and a flow control valve placed in the fluidizing gas inlet conduit.

DETAILED DESCRIPTION OF THE INVENTION

The present invention, in its process aspects, consists of steps for the cooling of a fluidized particulate solid. An important application of the invention will be for a process for the combustion of a combustible material from fluidized solid particles containing the combustible material, including the step of introducing oxygen-containing combustion gas and the fluidized solid particles into a combustion zone maintained at a temperature sufficient for oxidation of the combustible material. The combustible material will be oxidized therein to produce the hot fluidized solid particles cooled by the process of the invention. The combustion zone may be operated such that the particles are present in dilute phase with the hot particles transported to a disengaging zone wherein the hot particles are collected and maintained as a first bed, or the combustion zone may be operated with the particles in dense phase and in itself comprise the first bed.

In a particularly important embodiment of the invention, there will be included steps for the regenerative combustion within a combustion zone of a coke contaminated catalyst from a reaction zone to form hot flue gas and hot regenerated catalyst, disengagement and collection of the hot regenerated catalyst, cooling of the hot regenerated catalyst by backmixing and continuously circulating it or passing it through a heat removal or cooling zone, and the use of at least a portion of the cooled regenerated catalyst for control of the temperatures of the combustion zone. The catalyst being regenerated may be employed in a conventional FCC process. However, the subject invention finds particular use in processing higher boiling point range residual fuels than customarily charged to an FCC process. The term RCC process is now being used to describe this extension of conventional FCC technology. As used herein, such terms as "hot regenerated catalyst" or "hot particles" is intended to mean catalyst or particles near the normal temperature of catalyst leaving the combustion zone which is from about 1300° to about 1450° F. The relative terms "cool regenerated catalyst" or "cool particles" are intended to mean particles at the temperature desired for particles leaving the cooling zone, which is about 50° to about 200° F. less than the temperature of the hot regenerated catalyst. Cool regenerated catalyst may therefore have a temperature from about 1100° to about 1400° F.

Figure 1:
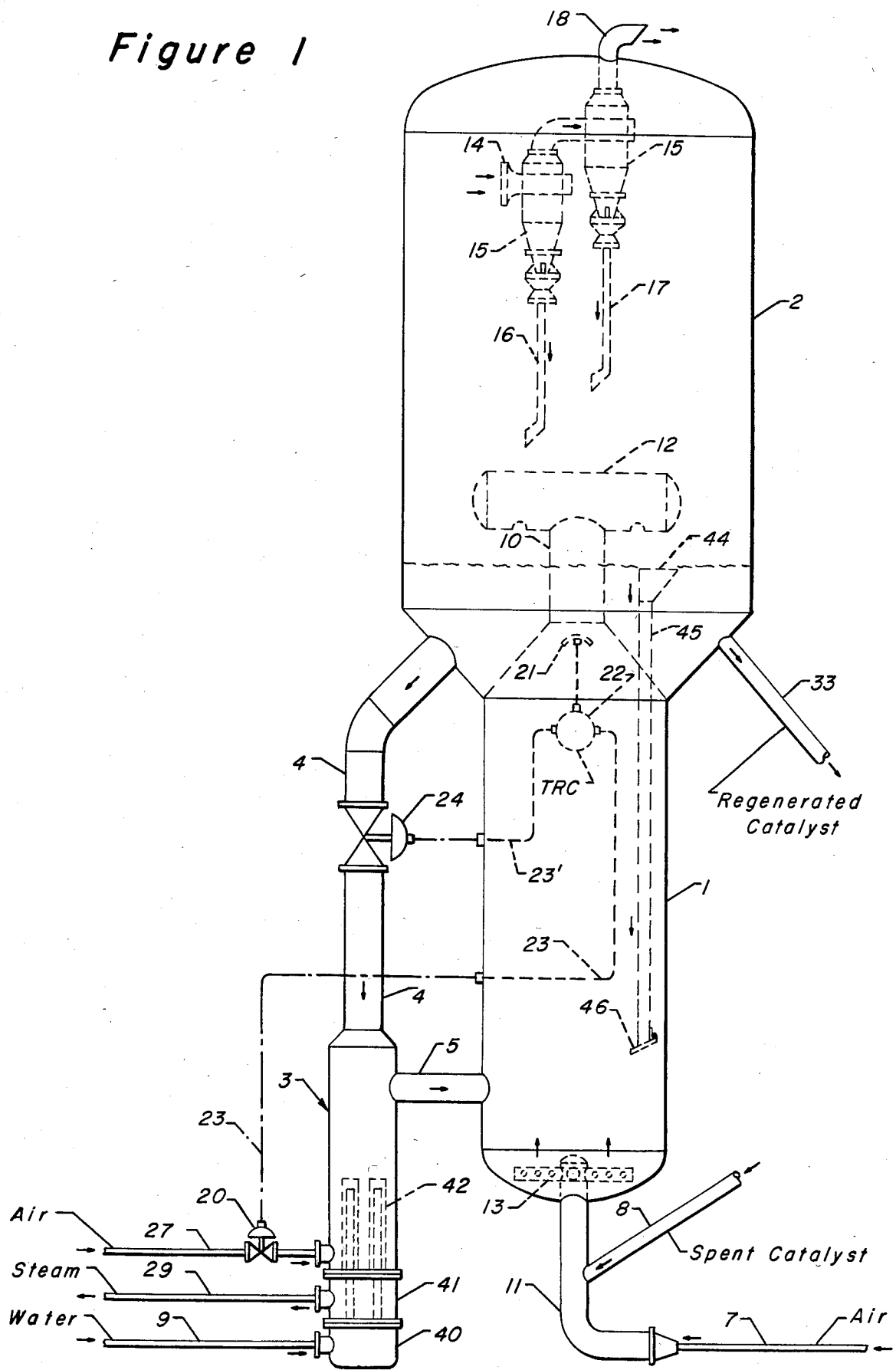
FIG. 1 is a sectional, elevation view of an FCC regeneration apparatus according to the embodiment of the present invention, showing combustion zone 1, disengagement zone 2 and vertical cooling zone 3. The above described drawing is intended to be schematically illustrative of the present invention and not place limitations thereon.

Reference will now be made to FIG. 1 of the attached drawing for a discussion of an example of the regeneration process embodiment and associated apparatus of the invention. The primary stream of regeneration (combustion) gas, which may be air or another oxygen-containing gas, enters in line 7 and mixes with coke contaminated catalyst entering in conduit 8. These streams are shown as flowing together in mixing conduit 11, although each stream could flow individually into combustion zone 1. The resultant mixture of coke contaminated catalyst and regeneration gas are distributed into the interior of combustion zone 1, at a lower locus thereof, via conduit 11 and distributor 13. Coke contaminated catalyst commonly contains from about 0.1 to about 5 wt. % carbon, as coke. Coke is predominantly comprised of carbon, however, it can contain from about 5 to about 15 wt. % hydrogen, as well as sulfur and other materials. The regeneration gas and entrained catalyst flows upward from the lower part of combustion zone 1 to the upper part thereof in dilute phase. The term "dilute phase", as used herein, shall mean a catalyst/gas mixture of less than 30 lbs/ft$^3$, and "dense phase" shall mean such mixture equal to or more than 30 lbs/ft$^3$. Dilute phase conditions often consist of a catalyst/gas mixture of about 2–10 lbs/ft$^3$. As the catalyst/gas mixture ascends within combustion zone 1, the heat of combustion of coke is liberated and absorbed by the now relatively carbon-free catalyst, in other words, by the regenerated catalyst.

The rising catalyst/gas stream flows through passageway 10 and impinges upon surface 12, which impingement changes the direction of flow of the stream. It is well known in the art that impingement of a fluidized particulate stream upon a surface, causing the stream to turn through some angle, can result in the separation from the stream of a portion of the solid material therein. The impingement of the catalyst/gas stream upon surface 12 causes almost all of the hot regenerated catalyst flowing from the combustion zone to disengage from the flue gas and fall to the bottom portion of disengagement zone 2 which comprises a hot particle collection chamber of fluid particle collection section. The catalyst collection area of the disengagement zone may be a cone-shaped annular receptacle, as shown, or any other shape appropriate for collecting catalyst particles. The gaseous products of coke oxidation and excess regeneration gas, or flue gas, and the very small uncollected portion of hot regenerated catalyst flow up through disengagement zone 2 and enter separation means 15 through inlet 14. Hot regenerated catalyst is returned to the FCC reactor via conduit 33.

These separation means may be cyclone separators, as schematically shown in the drawing, or any other effective means for the separation of catalyst from a gas stream. Catalyst separated from the flue gas falls to the bottom of disengagement zone 2 through conduits 16 and 17. The flue gas exits disengagement zone 2 via conduit 18, through which it may proceed to associated energy recovery systems. Having the disengagement zone in upward communication with the combustion zone is advantageous, in comparison to schemes in which the gas/catalyst mixture flows upward into a relatively dense phase heat removal zone, in that with the former, there is a substantial reduction in the loading of the regenerator cyclones which virtually eliminates large losses of catalyst from FCC units during operational upsets.

With further reference to FIG. 1, in one embodiment of the present invention, a portion of catalyst collected in the disengaging zone as a first dense phase fluidized bed is passed in dense phase, via hot catalyst recycle conduit 4, downwardly into cooling zone 3 which encloses vertical heat exchanger tubes 42. Cooling zone or chamber 3 is of vertical orientation with the catalyst flowing into the lower portion of the chamber and the heat exchange medium passing through the heat exchanger tubes via lines 9 and 29. The preferred heat exchange medium would be water, which would change at least partially from liquid to gas phase when passing through the tubes. The tube bundle in the heat exchanger will preferably be of the "bayonet" type wherein one end of the bundle is unattached, thereby minimizing problems due to the expansion and contraction of the heat exchanger components when exposed to and cooled from the very high regenerated catalyst temperatures. The heat transfer that occurs is, from the catalyst, through the tube walls and into the heat transfer medium.

A second smaller stream of fluidizing combustion gas, preferably air, is passed into a bottom portion of the cooling zone 3 via line 27, thereby maintaining a dense phase fluidized catalyst cooling bed within the cooling chamber. Control valve 20 is placed in line 27. Control valve 24 in conduit 4 regulates downward catalyst flow through conduit 4 into cooling zone 3. An associated control system will comprise means 21 to sense the temperature in a portion of combustion zone 1, such as the upper portion shown, temperature control means 22 having an adjustable set point connecting with temperature sensing means 21 and developing output signals, and means 23 and 23' for transmitting the output signals to control valve 20 and control valve 24, respectively, whereby the valves may be adjusted responsive to the temperature at the upper portion of combustion zone 1. Temperature control means 22, which may incorporate an analogue or digital computer, will have the capability of selecting the optimum combination of fluidizing gas and catalyst flow rates. Such capability may be built or programmed into means 22 for a given system by one skilled in the art and probably be based on empirical relationships derived from the observed operation of the system.

The flow of fluidizing gas to the cooling zone 3 and the flow of catalyst through conduit 4 and cooling zone 3 will thereby be regulated. This regulates the mass velocity of the fluidized bed over the outside surfaces of the tubes by affecting the extent of turbulence and mass flow of the bed. This in turn regulates the heat transfer coefficient across such surfaces, and thus the quantity of heat transfer. The high degree of turbulence and backmixing that will occur in the fluidized bed of cooling zone 3 will ensure that the hot catalyst from conduit 4 will not "short circuit" through the uppermost portion of the cooling chamber 3 and pass into combustion chamber 1 without being cooled. Baffles can be employed within the cooling zone to ensure proper initial mixing. The cooled catalyst will flow horizontally from cooling zone 3 through heat exchange catalyst discharge conduit 5 into the lower portion of combustion chamber 1. The combustion gas used to fluidize the particles in the cooler will flow laterally into the combustion zone through the same conduit as the cooled catalyst.

Details are shown in FIG. 1 of a preferred embodiment of heat exchanger 3 and the manner of the interconnection of heat exchanger 3 with disengagement zone 2 and combustion zone 1. Heat exchanger 3 is shown with the shell side filled with a dense phase fluidized catalyst bed. Catalyst flows into the inlet of conduit 4 from the catalyst collection section at the bottom of collection chamber 2 and flows through conduit 4 into heat exchanger 3 via control valve 24. The catalyst and fluidizing gas mixture will exit heat exchanger 3 via conduit 5 since control valve 24 will effectively block egress of that mixture up conduit 4.

An important feature of the present invention is that the fluidizing combustion gas that is used in heat exchanger 3 will leave heat exchanger 3 via conduit 5 and pass into combustion zone 1 where it will serve as an additional source of combustion gas. This is in contradistinction to previously discussed patents in which the cooling zone fluidizing gas is in a sense wasted because it is passed into the disengaging zone. The fluidizing gas is then unable to contribute to the regeneration of the catalyst in the combustion zone. Oxygen passed into the disengaging zone could support combustion within the disengaging zone. However, it is not normally desired to perform coke burnoff in the disengaging zone.

The tube bundle shown in cooling chamber 3 is of the bayonet type in which the tubes 42 are attached at the bottom or "head" of the heat exchanger, but not at any other location. A typical configuration of tubes in the bayonet type bundle would be one-inch tubes each extending upward from inlet manifold 40 into the shell of the exchanger inside a three-inch tube sealed at its top. Each one inch tube would empty into the three-inch tubes in which it is contained just below the sealed end of the three-inch tube. A liquid, such as water, would be passed into the one inch tubes, would empty into the three-inch tubes, would absorb heat from the hot catalyst through the wall of the three inch tubes as it passed downward through the annular space of the three-inch tubes and would exit the heat exchanger, at least partially vaporized, from outlet manifold 41 in the head of the exchanger. The vertical heat exchange tubes shown in the drawing can be replaced by tubes having various inclinations. For instance, the heat exchange tubes can be horizontal, as shown in FIG. 2, or inclined at a 45° angle from horizontal.

An important structural feature is that the cooling coils of the subject invention are entirely located within a lower portion of the cooling chamber well below the point at which the conduit which removes cooled particles is attached to the cooling chamber. This point divides the chamber into the upper and lower portions.

Solely as an example, the upper end of the heat exchange tubes of the embodiment of FIG. 1 should terminate at least about 2 to 3 feet below the draw off conduit to the combustion zone. This is an important feature of the subject invention as it allows the heat exchange tubes to be totally covered with a dense settled blanket of catalyst particles. That is, by terminating or greatly reducing the flow of the fluidizing gas into the bottom of the cooling chamber, particles can be allowed to settle into the bottom portion of the cooling chamber. This will result in a nonfluidized noncirculating mass of catalyst sitting in the bottom of the chamber and covering the cooling coils. The cooling coils are thereby insulated from hot catalyst particles entering the upper portion of the cooling chamber. The heat exchanger tubes of the subject invention are thereby kept sufficiently cool to prevent them from being damaged by overheating when no coolant is flowing through the tubes. The heat exchanger may therefore be removed from service without exposing the tubes to severe damage. This is very useful when the tubes are not required as during startup procedures or during the processing of low coke-producing charge stocks. The heat exchanger tubes are also protected from erosion by the circulating particles when covered by the stagnant particles. The use of the subject invention does not foreclose the use of additional heat exchange coils at other points within the overall apparatus. For instance, other prior art type cooling coils may be located within the hot catalyst recycle conduit, the combustion chamber or at higher elevations within the cooling chamber.

Figure 2:
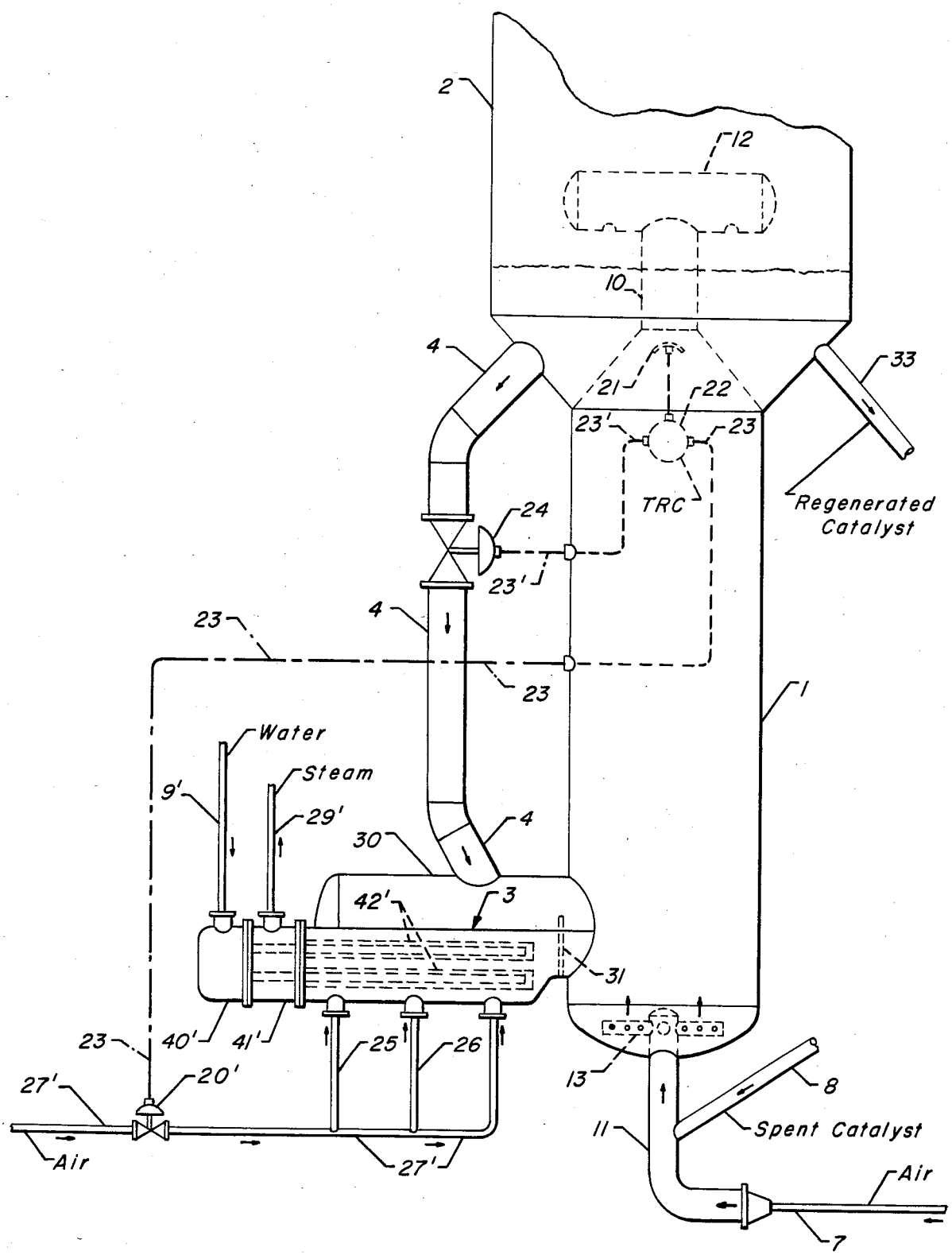
FIG. 2 is a sectional view of an FCC regeneration apparatus identical to that of FIG. 1 except that the cooling zone 3 is aligned horizontally rather than vertically as in FIG. 1.

FIG. 2 illustrates the use of the invention using apparatus having a modified structure. The elements employed in FIG. 2 are the same as those in FIG. 1 except that the heat exchange bundle is oriented in a horizontal rather than a vertical direction as in FIG. 1. To the maximum extent feasible, the same numerals are employed as labels in FIG. 2 as in FIG. 1. The numerals in FIG. 2 will have a prime added to them to distinguish from the numerals of FIG. 1 which identify the same equipment in a different orientation. FIG. 2 also differs from FIG. 1 in that the optional dipleg 45 shown on FIG. 1 is not present in the apparatus of FIG. 2. Therefore, in the apparatus of FIG. 2 all the catalyst flowing from the upper disengaging zone to the lower combustion zone must pass through the hot catalyst recycle conduit 4.

Referring now specifically to FIG. 2, it may be seen that the combustion zone 1 and the disengaging zone 2 are identical to that shown in FIG. 1 except that the dipleg 45 is not provided. The hot catalyst recycle conduit 4 and the control system is also identical to that shown in FIG. 1. The overall operation of the apparatus is therefore similar to that of the apparatus in FIG. 1, with the spent catalyst entering through line 8 for admixture with air from line 7. Coke upon the spent catalyst is combusted within the combustion zone, and the catalyst and resulting flue gases pass upward into the disengaging zone 2. Regenerated catalyst is removed through line 33.

It is normally desired to have some catalyst flowing downward into the combustion zone through conduit 4 in this embodiment. This is to provide hot catalyst to the combustion zone to ensure a proper temperature within this zone. In the previously described embodiment catalyst can flow through dipleg 45. The rate of flow of the hot catalyst is controlled by the valve means 24. The hot catalyst descends into the cooling zone or chamber 3 which is partially enclosed by the horizontal appendage 30 to the regeneration zone. Cooling water supplied to line 9' enters the water inlet manifold 40' and is distributed between the heat exchange tubes 42'. The water passes inward through the internal tube of these bayonet-type heat exchange tubes, emerges from the open end of the center tube and is converted to steam in the outer annular space of the heat exchange tube. The steam is then collected in the manifold 41' and removed from the process through line 29'. The generation of steam within the heat exchange tubes removes heat from the hot catalyst passing through the cooling chamber. The catalyst which spills over the vertical baffle 31 into the combustion zone from the cooling chamber 30 has therefore been cooled and will have a lower temperature relative to the hot catalyst descending through the conduit 4.

The rate of heat removal in the cooling zone is controlled by the rate of flow of the fluidizing gas supplied to the cooling zone. This is in addition to the control which is providable by regulating the rate of flow of hot catalyst through the recycle conduit 4. The air, which is the preferred fluidizing gas, enters through line 27' at a rate controlled by valve 20'. The air is then distributed at a plurality of points underneath the horizontal heat exchange tubes 42' through the three conduits 25, 26, and 27'. The fluidizing gas can be distributed to a plurality of points underneath the heat exchange tubes a number of different ways. For instance, a fluidizing gas may be passed into the cooling zone through more than three separate conduits with four or more conduits being provided for this purpose. Alternatively, the fluidizing gas may pass into the cooling zone via a single conduit which is attached to a gas distribution means located underneath the heat exchange tubes. In this embodiment, the gas would then flow into a single gas distribution grid or complex of pipes located within the cooling zone and exit from a multiplicity of openings provided within this grid. It is also envisioned that individual flow control devices could be provided on different fluidizing gas inlet conduits to further optimize the flow of the fluidizing gas through the dense phase catalyst bed retained within the cooling chamber and the catalyst mixing caused by the fluidization. The fluidization of the catalyst circulates it across the heat exchange coils. The fluidization also admixes cooled catalyst with hot catalyst descending through the recycle conduit. The discharge of the descending catalyst stream will also admix the catalyst.

In FIG. 2, the bottom portion of the hot catalyst recycle conduit 4 is slanted toward the combustion zone. This is to direct the descending catalyst towards the overflow space or passageway located above the baffle 31 such that the catalyst does not clog the flow path for catalyst between the conduit 4 and the combustion zone. Careful attention must be provided that the distance between the entrance point of the catalyst into the cooling zone and the point at which it enters the combustion chamber does not exceed that distance dictated by reference to the angle of repose of the catalyst within the cooling zone in an unfluidized state.

During periods when it is not desired to remove heat from the catalyst regeneration zone through the use of the indirect heat exchange tubes 42', the flow of the fluidizing gas is terminated. This allows catalyst particles to accumulate within the lower portion of the cooling zone or chamber. The settled particles cover the heat exchange tubes thereby protecting them and removing them from contact with hot catalyst. The flow of water through the heat exchange tubes may be maintained but the heat removal occurring in the cooling zone will be greatly minimized as the heat exchange tubes themselves will be surrounded by an essentially stagnant bed of catalyst. Therefore, even though there is local cooling of the catalyst adjacent to the heat exchange tubes, this cooled catalyst will not be admixed with the remainder of the catalyst present within the cooling zone or circulating through the regeneration zone.

The particle cooling zone (chamber) of the subject invention is referred to herein as a "backmixed" cooler. This is in comparison to a "flow through" particle cooler. As used herein the term backmixed cooler is intended to refer to an indirect heat exchanger in which particles being cooled are churned or mixed in both vertical directions through the use of a fluidizing gas which is passed into a lower point in the cooler at least below the majority of the cooling coils. All conduits for particle flow are located in the upper portion of the cooling chamber. Heat is transported downward by the moving catalyst in the fluidized dense particle bed within the cooling chamber. The catalyst cooler shown in previously cited U.S. Pat. No. 4,364,849 is a backmixed cooler. In a flow through catalyst cooler, the catalyst flows through the heat exchange volume in single direction, usually downward. For instance, the cooler of U.S. Pat. No. 4,425,301 is a flow through cooler (FIG. 2 shows an upflow cooler). Fluidizing gas can be used as shown in this reference to regulate heat transfer in a flow through cooler. It is essential that the quantity of particles or catalyst retained in cooling chamber 3 is sufficient to maintain a depth of dense phase fluid catalyst bed which substantially submerges the tubes in a dense phase bed. There are a number of ways of accomplishing this objective, one of which is shown in the Figure.

It is assumed that the flow of hot catalyst into the disengagement zone will always exceed the heat exchanger and hot regenerated catalyst exit (via conduit 33) flow requirements and the operation will be set up so that will in fact be the case. Shown in the drawing is dipleg or standpipe 45 with bottom flapper valve 46 and upper collection pot 44. The upper edge of the collection pot serves as a weir which restrains catalyst flow into the dipleg. Catalyst which does not flow through heat exchanger 3 and conduit 33 will overflow the weir and fill dipleg 45. When the force exerted by the head of catalyst filling dipleg 45 on flapper valve 46 exceeds that pressure required to open valve 46, i.e., overcome the force exerted by the spring or counterweight holding the valve closed, catalyst will empty from the dipleg into combustion chamber 1. The flapper valve and/or head of catalyst in the dipleg also serve to prevent undesired reversal of flow up the dipleg. The dense phase bed level and thus the catalyst head available to heat exchanger 3 will therefore be held at the level of the top of the collection pot 44.

The above scheme provides the ability to remove heat from the FCC regenerator as required to maintain a maximum combustion zone temperature and at the same time maintains an acceptable degree of stable steady state operation conducive to the controllability and efficiency of the regenerator, all while enjoying flexibility and ease of operation of an external catalyst cooler or heat exchanger. In particular the invention eliminates any requirement to operate cooling coils during start-up or during normal operation when it is not required. The invention also provides the efficiency of catalyst flue gas separation achieved by a disengagement zone which is unencumbered by a dense catalyst phase and heat removing paraphernalia. Furthermore, such scheme achieves the heretofore unrealized advantage of the subsequent use of fluidizing gas for combustion.

It should be emphasized that the FCC embodiment illustrated in the drawing is only one possible application of the present invention which in its broadest sense is a process for cooling any hot fluidized particles for any purpose. Furthermore, although the drawing incorporates details to illustrate a particularly preferred embodiment of the present invention, i.e., cooling means associated with an FCC regenerator wherein there is a net flow of catalyst through the cooling means, it is also possible that conduit 4 and control valve 24 may be dispensed with, hot fluidized particles being maintained at a lower locus of the combustion zone as a first dense phase fluidized bed, with the open communication between the cooling zone and combustion zone such as provided by conduit 5, occurring below the upper boundary of such first dense phase fluidized bed. The first bed and the cooled bed in cooling zone 3 will thus comprise a continuum throughout which the particles will continuously circulate and backmix.

This embodiment of the invention may be characterized as an apparatus for the combustion of a combustible material present on fluidized solid particles which apparatus comprises a vertically oriented combustion chamber; a second processing chamber located superadjacent to said combustion chamber and in communication therewith, and means to fluidize and transfer particles upward from the combustion chamber to the second processing chamber; a vertically oriented cooling chamber surrounding at least one heat exchanger of vertical orientation, the cooling chamber having a particle transfer opening with the entire heat exchanger being located below said particle transfer opening; a horizontal open passageway connecting said particle transfer opening of said cooling chamber with said combustion chamber and providing means for the flow of particles between said heat exchanger and said combustion chamber and for the flow of fluidizing combustion gas from the cooling chamber to the combustion chamber; a fluidizing combustion gas inlet conduit connected to a bottom portion of the cooling chamber providing means for the passage of a fluidizing gas onto the shell side of said heat exchanger and maintaining a fluidized catalyst bed within the cooling chamber, and means to control the flow of said fluidizing gas through said inlet conduit. The upper processing chamber may be a particle disengagement chamber such as shown in the drawing. Alternatively the upper processing chamber may be a second combustion chamber or stage. If the upper zone is employed for combustion, a means to supply oxygen-containing combustion and fluidizing gas to the upper chamber is preferably also provided.

It is also within the scope of the present invention to have at least one additional cooling zone similar to that shown in the drawing attached to the combustion zone. Thus, the apparatus of the drawing may be imagined to have a second cooling zone, like cooling zone 3, along with all associated conduits, lines and valves. It would be preferred that the particle flow rate through the additional cooler be fixed such that the particle flow rate and the quantity of the stream of fluidizing gas through the additional zone will result in the additional zone accounting for about 50% of the total heat to be withdrawn from the combustion zone by the cooling zones. A restriction orifice of fixed dimensions placed in the conduit to the additional cooling zone in lieu of a control valve may effect the desired constant flow rate of particles therethrough for a specific pressure drop across the orifice. The pressure drop across the orifice may be largely fixed by fixing a constant depth of dense fluidized bed above the orifice by means such as overflow weir of collection pot 44 of the drawing.

I claim as my invention:

1. A process for the combustion of a combustible material present on fluidized catalyst particles employed in a hydrocarbon conversion process which comprises the steps of:
   (a) introducing a first stream of oxygen-containing combustion gas and said fluidized catalyst particles into a combustion zone maintained at a temperature sufficient for oxidation of said combustible material and therein oxidizing said combustible material to produce hot fluidized catalyst particles;
   (b) passing catalyst particles upward by fluidization from the combustion zone into a second zone located above the combustion zone, and collecting a dense phase bed of hot catalyst particles in a particle collection section located at the bottom of said second zone;
   (c) transferring a stream of catalyst particles downward from said particle collection section through a particle flow control means and a vertically orientated first particle transfer conduit into an upper end of a backmixed particle cooling chamber;
   (d) admixing said stream of catalyst particles into a backmixed dense phase particle bed located in a lower portion of the particle cooling chamber;
   (e) fluidizing said dense phase fluidized particle bed located in the particle cooling chamber in a controlled manner by the upward passage of a controlled flow of a second stream of oxygen-containing combustion gas;
   (f) cooling particles present in the backmixed dense phase fluidized particle bed located in the particle cooling chamber through the use of a heat exchanger entirely present in the lower portion of the particle cooling chamber;
   (g) discharging the second stream of combustion gas and catalyst particles from the cooling chamber into the combustion zone through a second particle transfer conduit communicating with the cooling chamber at a point above the heat exchanger, and
   (h) reducing or terminating the flow of the second stream of combustion gas and the admixture of said stream of particles into the dense phase particle bed located in the lower portion of the cooling chamber to thereby:
      (i) reduce or terminate the fluidization of the particle bed located in the lower portion of the cooling chamber and catalyst cooling as desired for operation of the process and thereby substantially covering at least a portion of said heat exchanger with a stagnant bed of catalyst particles while:
      (ii) still maintaining the downward flow of said stream of catalyst particles into the upper end of the cooling chamber and through said second particle transfer conduit into the combustion zone.

2. The process of claim 1 further characterized in that the second stream of combustion gas and catalyst particles is discharged substantially horizontally from the cooling chamber to the combustion zone.

3. The process of claim 2 further characterized in that the solid particles are catalyst employed in a fluidized catalytic cracking process.

4. The process of claim 3 further characterized in that the second zone functions as a catalyst combustion gases disengaging zone.

5. The process of claim 3 further characterized in that the flow rate of the second stream of combustion gas into the cooling zone is controlled in response to a temperature measured within the combustion zone.

6. The process of claim 5 further characterized in that the flow rate of the stream of particles downward through the first particle transfer conduit is controlled by a variable flow control valve in response to said temperature measured within the combustion zone.

7. The process of claim 6 further characterized in that there is at least one additional backmixed particle cooling chamber employed at another separate location in the process, with the particle flow rate through the additional cooling chamber being fixed at a specific rate.

8. The process of claim 5 further characterized in that the stream of particles flowing downward through the first particle transfer conduit passes through a flow control orifice of fixed opening dimension.

* * * * *